(12) United States Patent
Okahisa et al.

(10) Patent No.: US 10,836,042 B2
(45) Date of Patent: Nov. 17, 2020

(54) ROBOT SYSTEM

(71) Applicant: KABUSHIKI KAISHA YASKAWA DENKI, Kitakyushu (JP)

(72) Inventors: Manabu Okahisa, Fukuoka (JP); Ryuta Kagawa, Fukuoka (JP); Hikaru Inoue, Fukuoka (JP); Tatsuo Hiro, Fukuoka (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 398 days.

(21) Appl. No.: 15/807,574

(22) Filed: Nov. 9, 2017

(65) Prior Publication Data

US 2018/0065254 A1 Mar. 8, 2018

Related U.S. Application Data

(63) Continuation of application No. PCT/JP2015/068890, filed on Jun. 30, 2015.

(51) Int. Cl.
*B25J 9/00* (2006.01)
*B25J 9/16* (2006.01)
(Continued)

(52) U.S. Cl.
CPC .......... *B25J 9/1676* (2013.01); *B25J 9/047* (2013.01); *B25J 9/06* (2013.01); *B25J 9/1643* (2013.01); *G05B 2219/39082* (2013.01)

(58) Field of Classification Search
CPC ........ B25J 19/00; B25J 19/0045; B25J 18/02; B25J 9/1664; B25J 9/04; B25J 9/123;
(Continued)

(56) References Cited

U.S. PATENT DOCUMENTS 5,606,235 A * 2/1997 Mauletti .................. B25J 9/046
318/625
6,655,901 B2 12/2003 Tsubota et al.
(Continued)

FOREIGN PATENT DOCUMENTS

DE 112007000305 T5 1/2009
JP 05-220681 8/1993
(Continued)

OTHER PUBLICATIONS

International Search Report for corresponding International Application No. PCT/JP2015/068890, dated Aug. 25, 2015.
(Continued)

*Primary Examiner* — Victor L MacArthur
(74) *Attorney, Agent, or Firm* — Mori & Ward, LLP

(57) ABSTRACT

A robot system includes a robot and a motion control unit. The robot includes a bottom, a swiveling base, first to third arms. A bottom side of the first arm is supported on the swiveling base swivelably around a horizontal-direction second axis. A bottom side of the redundant arm is supported on a leading side of the first arm swivelably around an axis parallel to the second axis. A bottom side of the second arm is supported on a leading side of the redundant arm swivelably around a third axis parallel to the second axis. A bottom side of the third arm is supported on a leading side of the second arm rotatably around a fourth axis perpendicular to the third axis. The motion control unit activates the redundant arm so that a control point provided on the fourth axis linearly moves while maintaining a direction of the fourth axis.

5 Claims, 9 Drawing Sheets

(51) Int. Cl.
*B25J 9/06* (2006.01)
*B25J 9/04* (2006.01)

(58) Field of Classification Search
CPC ...... B25J 19/0008; B25J 19/0004; B25J 9/12; H02K 7/06; H02J 50/10
See application file for complete search history.

(56) References Cited

U.S. PATENT DOCUMENTS

| | | | | |
|---|---|---|---|---|
| 6,931,745 | B2 * | 8/2005 | Granger | G01B 5/008 33/1 PT |
| 7,395,606 | B2 * | 7/2008 | Crampton | G01B 5/008 33/503 |
| 8,469,947 | B2 * | 6/2013 | Devengenzo | A61B 1/00149 606/1 |
| 8,986,181 | B2 * | 3/2015 | Takazakura | B25J 15/04 483/37 |
| 9,827,678 | B1 * | 11/2017 | Gilbertson | A47L 11/24 |
| 2002/0057955 | A1 | 5/2002 | Tsubota et al. | |
| 2002/0104227 | A1 * | 8/2002 | Trull | G01B 5/012 33/558 |
| 2003/0167647 | A1 * | 9/2003 | Raab | B23Q 35/04 33/503 |
| 2010/0222918 | A1 | 9/2010 | Nonaka et al. | |
| 2017/0020615 | A1 * | 1/2017 | Koenig | A61B 34/30 |

FOREIGN PATENT DOCUMENTS

| | | |
|---|---|---|
| JP | 06-047689 | 2/1994 |
| JP | 06-42090 U | 6/1994 |
| JP | 07-108476 | 4/1995 |
| JP | 09-314487 | 12/1997 |
| JP | 2002-210684 | 7/2002 |
| JP | 2007-221031 | 8/2007 |
| JP | 2012-196766 | 10/2012 |
| JP | 2012-228761 | 11/2012 |

OTHER PUBLICATIONS

Written Opinion for corresponding International Application No. PCT/JP2015/068890, dated Aug. 25, 2015.
Kircanski, Combined Analytical-Gradient-Projection Inverse Kinematic Solutions for Simple Redundant Manipulators, 'Robots in Unstructured Environments', Jun. 1991, pp. 1228-1231, 1999., 91 ICAR., vol. 2, Proceedings of Fifth International Conference on Advanced Robotics.
Xia et al.; Analytical inverse Kinematic Computation for Anthropomorphic Manipulator based on Human-Like Motion Optimization and Maximum Reachable Region Optimization, Dec. 2014, pp. 2292-2297, Proceedings of 2014 IEEE, International Conference on Robotics and Biomimetics (ROBIO).
English translation of the Written Opinion for corresponding International Application No. PCT/JP2015/068890, dated Aug. 25, 2015.
Kircanski, Combined Analytical-Gradient-Projection Inverse Kinematic Solutions for Simple Redundant Manipulators, 'Robots in Unstructured Environments', Jun. 1991, pp. 1228-1231, 1991., 91 ICAR., vol. 2, Proceedings of Fifth International Conference on Advanced Robotics.
German Office Action for corresponding DE Application No. 112015006669.1, dated May 28, 2018.
Summons for corresponding German Application No. 11 2015 006 669.1, dated Jun. 18, 2019.
German Office Action for corresponding DE Application No. 112015006669.1, dated Oct. 4, 2018.
Chinese Office Action for corresponding CN Application No. 201580080840.6, dated Mar. 27, 2020.
Chinese Office Action for corresponding CN Application No. 201580080840.6, dated Sep. 27, 2020.

* cited by examiner

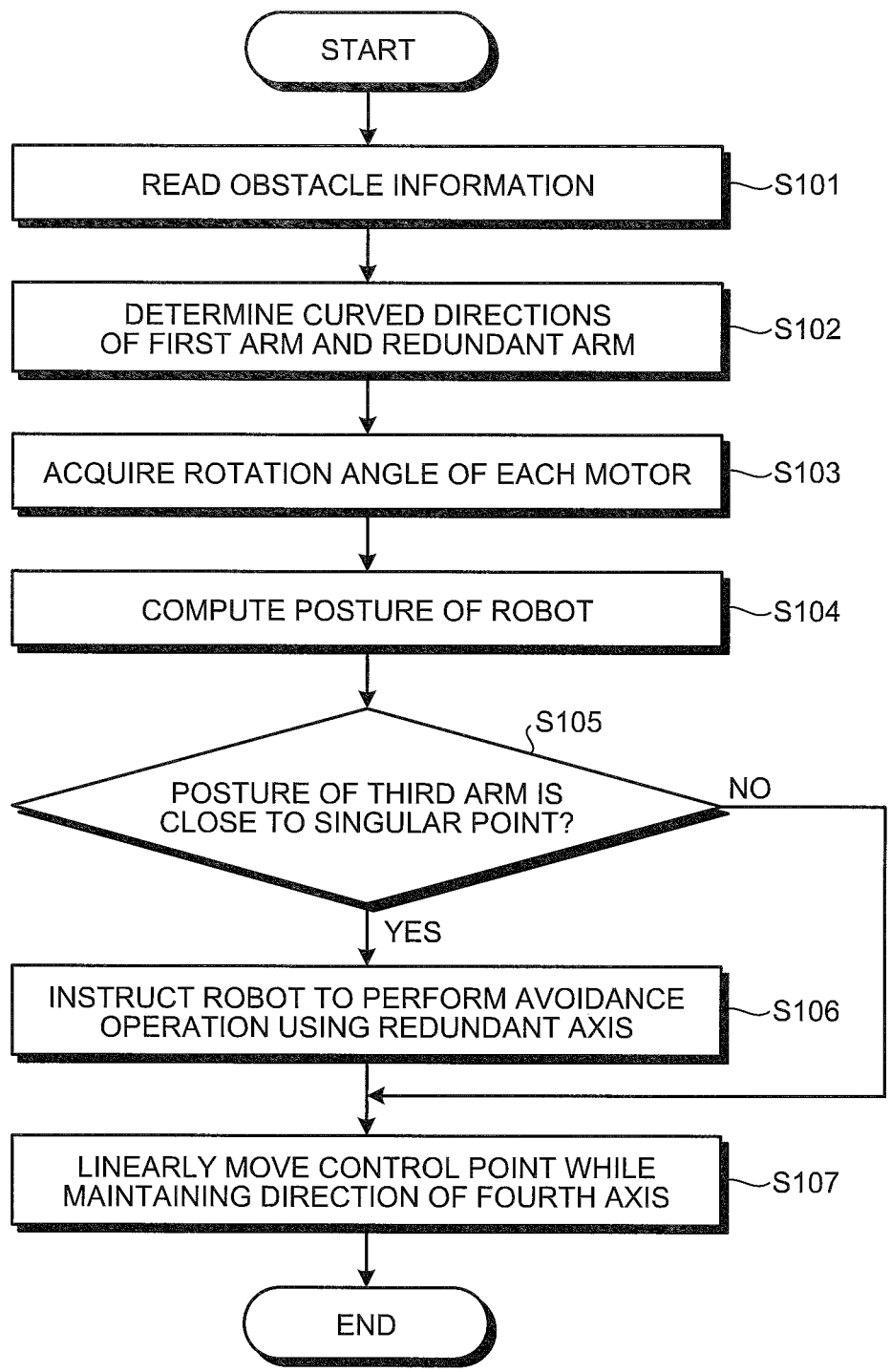

US 10,836,042 B2

ROBOT SYSTEM

CROSS-REFERENCE TO RELATED APPLICATION

This application is a continuation of PCT international application Ser. No. PCT/JP2015/068890 filed on Jun. 30, 2015, the entire contents of which are incorporated herein by reference.

FIELD

The embodiment discussed herein relates to a robot system.

BACKGROUND

A conventional robot that operates by individually driving a plurality of joints has been known. An end effector according to an application such as welding and gripping is attached to a leading end of the robot to perform various works such as a process and a movement of a workpiece.

A six-axis vertical articulated robot is widely used as this kind of robot (see Japanese Laid-open Patent Publication No. 2012-196766, for example).

However, when using the above conventional six-axis robot, a robot arm (hereinafter, simply "arm") interferes with a robot main body and equipment other than the robot, and thus an operating range of the robot may substantially become narrow. For example, when causing the leading end of a robot to enter a space whose opening is narrow and inside is deep, it may be impossible to avoid interference between the opening and the arm.

An aspect of an embodiment has been achieved in view of the above problem, and an object of the embodiment is to provide a robot system that can reduce interference of an arm.

SUMMARY

A robot system according to one aspect of an embodiment includes a robot and a motion control unit. The robot includes a bottom, a swiveling base, a first arm, a redundant arm, a second arm, and a third arm. A bottom side of the first arm is supported on the swiveling base swivelably around a horizontal-direction second axis. A bottom side of the redundant arm is supported on a leading side of the first arm swivelably around a redundant axis parallel to the second axis. A bottom side of the second arm is supported on a leading side of the redundant arm swivelably around a third axis parallel to the second axis. A bottom side of the third arm is supported on a leading side of the second arm rotatably around a fourth axis perpendicular to the third axis. The motion control unit activates the redundant arm so that a control point provided on the fourth axis linearly moves with maintenance of a direction of the fourth axis. The control point is a reference point when performing a control of the robot.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 9 is a flowchart illustrating a processing procedure that is executed by a robot controller.

DESCRIPTION OF EMBODIMENT

Hereinafter, an exemplary embodiment of a robot system disclosed in the present application will be explained in detail with reference to the accompanying drawings. In addition, the embodiment disclosed below is not intended to limit the present invention.

Figure 1:
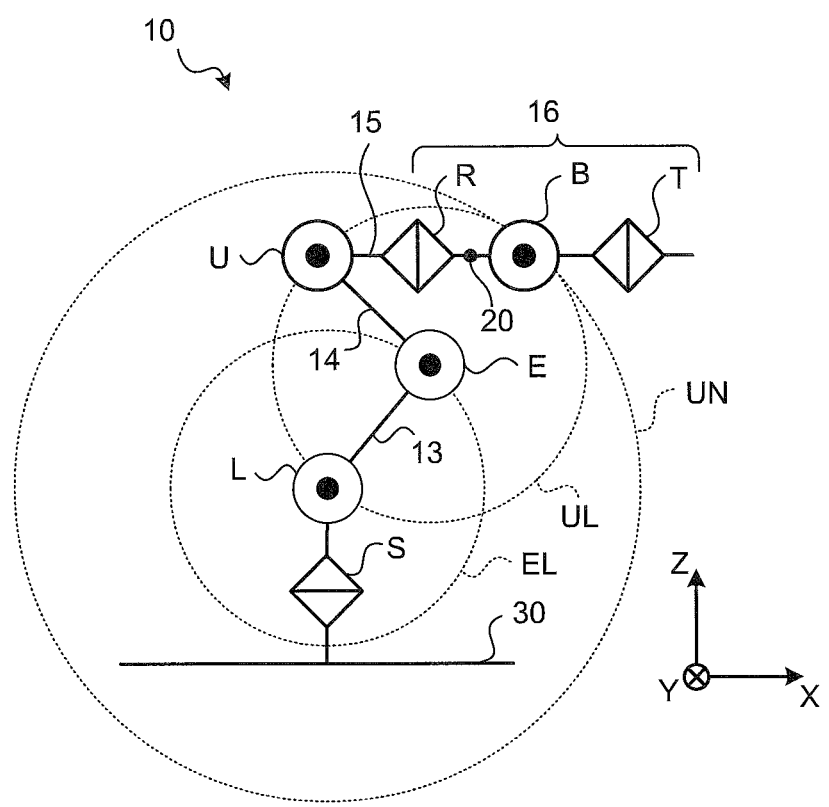
FIG. 1 is a schematic diagram illustrating the outline of a robot according to an embodiment.

First, the outline of a robot 10 according to an embodiment will be explained with reference to FIG. 1. FIG. 1 is a schematic diagram illustrating the outline of the robot 10. Only a partial configuration of the robot 10 is illustrated in FIG. 1, and the details are explained below with reference to FIG. 2. In order to simplify the explanation, a three-dimensional rectangular coordinate system including the Z axis whose vertically upward direction is a positive direction is illustrated in FIG. 1. The rectangular coordinate system may be employed even in other drawings that are used in the following explanations.

As illustrated in FIG. 1, the robot 10 includes joints respectively corresponding to a first axis S, a second axis L, a redundant axis E, a third axis U, a fourth axis R, a fifth axis B, and a sixth axis T. The robot 10 changes the posture of each arm by swiveling or rotating the corresponding arm by using a motor 10a (see FIG. 3) that is an actuator for driving each of the joints. As described above, the robot 10 is a seven-axis robot having the redundant axis E.

Hereinafter, "the first axis S", "the second axis L", "the redundant axis E", "the third axis U", "the fourth axis R", "the fifth axis B", and "the sixth axis T", which are the rotation axes of the respective joints, may be used as the names of the respective joints.

As illustrated in FIG. 1, a joint that has a rotation axis, for changing an angle formed by adjacent arms, such as the second axis L, the redundant axis E, the third axis U, and the fifth axis B is called a "swiveling joint", and a joint that has a rotation axis, for relatively rotating adjacent arms without changing an angle formed by the adjacent arms, such as the first axis S, the fourth axis R, and the sixth axis T is called a "rotational joint". Herein, because the second axis L, the redundant axis E, and the third axis U do not include a rotational joint on the way, they are always parallel to each other.

In the present drawing, each of the joints of the robot 10 is symbolized, the "rotational joint" is indicated with a rhombus and the "swiveling joint" is indicated with a circle.

A line that links diagonal lines of a rhombic symbol corresponding to the "rotational joint" corresponds to a rotation surface of a joint, and the joint rotates around a rotation axis perpendicular to the line. Moreover, a point that is located at the center of a circle corresponding to the "swiveling joint" corresponds to a rotation axis, and a joint rotates around the rotation axis.

The robot 10 includes a first arm 13 to swivel around the second axis L, a redundant arm 14 to swivel around the redundant axis E, and a second arm 15 to swivel around the third axis U. The robot 10 further includes a third arm 16 having the fourth axis R, the fifth axis B, and the sixth axis T on the leading side of the second arm 15. Herein, a control point 20 is set on the fourth axis R. The control point 20 indicates a reference point when performing the control of the robot 10.

In FIG. 1, the control point 20 is illustrated between a joint corresponding to the fourth axis R and a joint corresponding to the fifth axis B. The control point 20 can be set at an arbitrary position if its position is on the fourth axis R. For example, the control point 20 can be set at an intersection point between the fourth axis R and the fifth axis B.

Conventionally, a six-axis robot that does not have the redundant axis E and the redundant arm 14 as described above has been widely used. When using the six-axis robot, the third axis U is placed on the leading end of the first arm 13, and the second arm 15 swivels around the third axis U.

However, because the third axis U is moved along a circle centering on the second axis L in the six-axis robot, the third axis U cannot be moved along a direction (horizontal direction) parallel to the X axis and a direction (vertical direction) parallel to the Z axis of the present drawing.

In other words, because the third axis U that moves over a circle centering on the second axis L parallel to the Y axis changes an X coordinate and a Z coordinate simultaneously, the Z coordinate cannot be changed without changing the X coordinate, or the X coordinate cannot be changed without changing the Z coordinate. For this reason, the control point 20 provided on the fourth axis R cannot be linearly moved with the maintenance of the direction of the fourth axis R.

The robot 10 according to the embodiment can move the third axis U in a horizontal direction and a vertical direction by employing a seven-axis robot that includes the redundant axis E and the redundant arm 14 as described above. Therefore, according to the robot 10, the control point 20 provided on the fourth axis R can be linearly moved with the maintenance of the direction of the fourth axis R located on the leading side of the third axis U.

Specifically, the redundant axis E located on the leading side of the first arm 13 is movable over a trajectory EL illustrated with a circle in FIG. 1. Herein, the trajectory EL is indicated as a circle in FIG. 1, but becomes spherical actually because a rotation around the first axis S is included. Moreover, when the redundant axis E is located at the position illustrated in FIG. 1, the third axis U located on the leading side of the redundant arm 14 is movable over a trajectory UL illustrated with a circle.

When the redundant axis E is moved on the trajectory EL, a range in which the trajectory UL passes corresponds to the whole area within a movable range UN illustrated in the present drawing. In other words, the third axis U can be moved to an arbitrary position within the movable range UN. Although the movable range UN is indicated as a circle in FIG. 1, the movable range UN becomes spherical actually because a rotation around the first axis S is included. In order to simplify the explanation, the explanations as described above disregards interference between arms of the robot 10 and interference with an installation surface 30.

From the above, the robot 10 can move the third axis U located on the bottom side (leading side of the redundant arm 14) of the second arm 15 to an arbitrary position of the movable range UN. Therefore, it is possible to move the third axis U along an arbitrary straight line within the movable range UN. Furthermore, because the second arm 15 is freely swiveled around the third axis U, the direction of the fourth axis R in the third arm 16 attached to the leading side of the second arm 15 can be freely changed.

As described above, assuming that the third axis U is linearly moved within the spherical movable range UN, the control point 20 provided on the fourth axis R can be linearly moved with the maintenance of the direction of the fourth axis R. The details of a specific motion of the robot 10 that linearly moves the control point 20 will be explained below with reference to FIGS. 4A to 4C, FIGS. 5A to 5C, FIGS. 6A to 6C, and FIGS. 7A to 7C.

Figure 2:
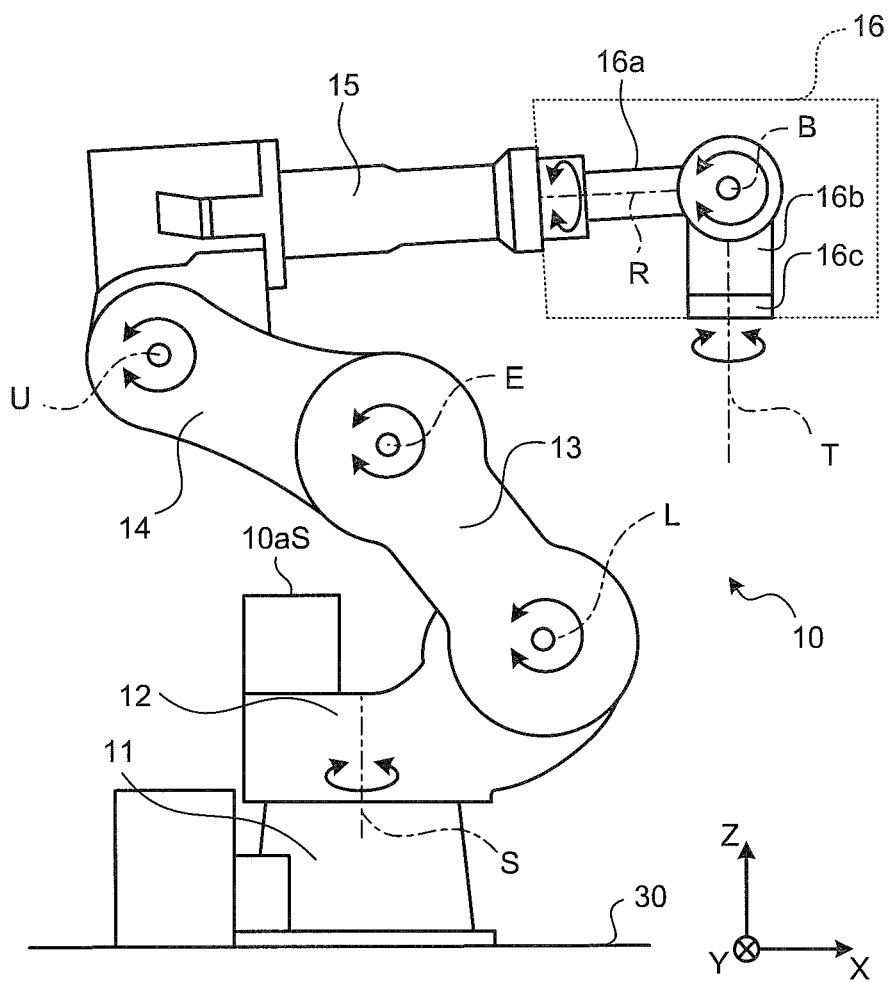
FIG. 2 is a side view of the robot.

Next, the specific configuration of the robot 10 will be explained with reference to FIG. 2. FIG. 2 is a side view of the robot 10. As illustrated in the present drawing, the robot 10 includes a base 11, a swiveling base 12, the first arm 13, the redundant arm 14, the second arm 15, and the third arm 16 from the bottom side toward the leading side. The third arm 16 includes a rotating arm 16a, a swivel arm 16b, and a rotating arm 16c from the bottom side toward the leading side. The swiveling base 12 is an example of first means. The first arm 13 is an example of second means. The redundant arm 14 is an example of third means. The second arm 15 is an example of fourth means. The third arm 16 is an example of fifth means.

The base 11 is fixed to the installation surface 30 such as a floor. The swiveling base 12 is supported on the base 11 rotatably around the vertical-direction first axis S. The bottom side of the first arm 13 is supported on the swiveling base 12 swivelably around the horizontal-direction second axis L. The bottom side of the redundant arm 14 is supported on the leading side of the first arm 13 swivelably around the redundant axis E parallel to the second axis L.

Therefore, when the first arm 13 and the redundant arm 14 have a posture to be bent, the robot 10 can have postures in which the redundant axis E that is the rotation axis of the redundant arm 14 protrude in the positive direction of the X axis and in the negative direction of the X axis in the posture illustrated in FIG. 1. The determination of which of these postures is taken is performed by a posture determining unit 113 (see FIG. 3) of a robot controller 100. The details of this point will be below explained.

The bottom side of the second arm 15 is supported on the leading side of the redundant arm 14 swivelably around the third axis U parallel to the second axis L and the redundant axis E. The bottom side of the third arm 16 is supported on the leading side of the second arm 15 rotatably around the fourth axis R perpendicular to the second axis L, the redundant axis E, and the third axis U.

Specifically, the bottom side of the rotating arm 16a of the third arm 16 is supported on the leading side of the second arm 15 rotatably around the fourth axis R as described above, and the bottom side of the swivel arm 16b is supported on the leading side of the rotating arm 16a swivelably around the fifth axis B perpendicular to the fourth axis R.

The bottom side of the rotating arm 16c is supported on the leading side of the swivel arm 16b rotatably around the sixth axis T perpendicular to the fifth axis B. Moreover, an end effector (not illustrated) prepared for each of applications such as welding and gripping can be attached to and detached from the rotating arm 16c that is a leading arm of the robot 10.

As described above, the fourth axis R and the fifth axis B are perpendicular to each other, and the fifth axis B and the sixth axis T are perpendicular to each other. For this reason, the fourth axis R and the sixth axis T have an intersecting relation. Therefore, when the third arm 16 has temporarily a posture in which the fourth axis R and the sixth axis T are located on a straight line, a problem of a singular point comes about. Therefore, in order to avoid the singular point, the robot controller 100 according to the embodiment makes the robot 10 perform a motion that utilizes the redundant axis E. This point will be explained below with reference to FIG. 8.

The swiveling base 12 of the robot 10 includes a motor 10aS, which rotates the swiveling base 12 around the first axis S, on its upper surface, for example. When the motor 10aS is placed at the position, the robot controller needs to activate the robot 10 so that each arm and the motor 10aS do not interfere with each other. Therefore, in order to avoid the interference, the robot controller 100 according to the embodiment makes the robot 10 perform a motion that utilizes the redundant axis E. This point will be explained below with reference to FIGS. 5A to 5C and FIGS. 6A to 6C.

In the posture illustrated in FIG. 1, the swiveling base 12 of the robot 10 offsets the second axis L in the positive direction of the X axis compared to the first axis S. Moreover, in the posture illustrated in FIG. 1, the second arm 15 of the robot 10 offsets the fourth axis R in the positive direction of the Z axis compared to the third axis U. These offset amounts can be appropriately defined in accordance with a work description etc. of the robot 10.

Figure 3:
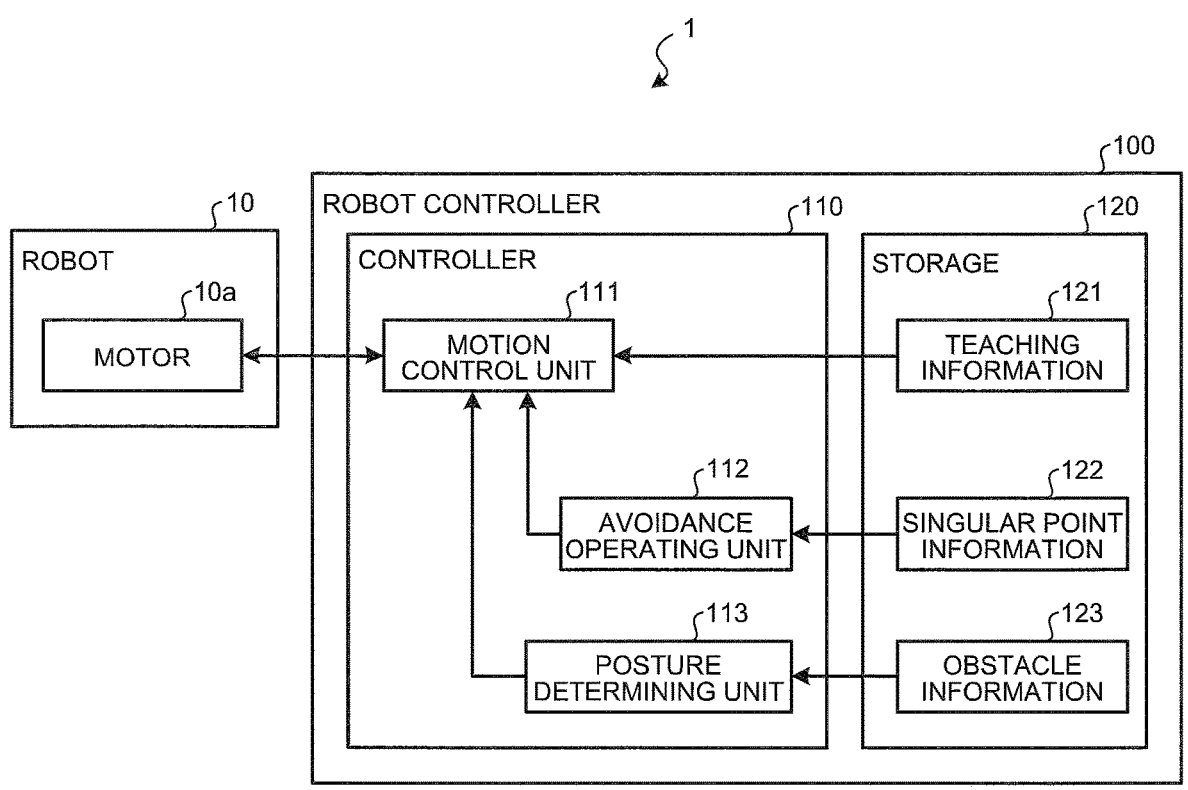
FIG. 3 is a block diagram illustrating the configuration of a robot system.

Next, a robot system 1 according to the embodiment will be explained with reference to FIG. 3. FIG. 3 is a block diagram illustrating the configuration of the robot system 1. As illustrated in FIG. 3, the robot system 1 includes the robot 10 and the robot controller 100. The robot 10 is connected to the robot controller 100.

The robot 10 is a robot that performs a predetermined operation in accordance with an instruction from the robot controller 100. As already explained above by using FIG. 2, the robot 10 is a robot of which a plurality of arms are connected to each other by using joints, and includes a motor 10a in each of the joints. As described above, because the robot 10 according to the embodiment is a seven-axis robot, the number of the motors 10a is seven.

A servo motor that includes an encoder for detecting a rotation angle can be used as the motor 10a. The robot controller 100 causes the robot 10 to take a desired posture by performing a feedback control or the like while using an encoder value in the motor 10a. Because the specific configuration of the robot 10 has been already explained with reference to FIG. 2, explanations herein are omitted.

Herein, a "posture" indicates a combination of the rotation amounts of the joints. In other words, a "posture" does not indicate only an outer shape when being viewed, and it is assumed that "its posture is changed" if adjacent arms are rotated even if its outer shape is not changed.

The robot controller 100 includes a controller 110 and a storage 120. The controller 110 includes a motion control unit 111, an avoidance operating unit 112, and the posture determining unit 113. The storage 120 stores therein teaching information 121, singular point information 122, and obstacle information 123. The motion control unit 111 is an example of sixth means.

Herein, the robot controller 100 includes a computer and various types of circuits that have a central processing unit (CPU), a read only memory (ROM), a random access memory (RAM), a hard disk drive (HDD), an input-output port, and the like, for example.

The CPU of the computer functions as the motion control unit 111, the avoidance operating unit 112, and the posture determining unit 113 of the controller 110 by reading out and executing a program stored in the ROM, for example.

At least one or the whole of the motion control unit 111, the avoidance operating unit 112, and the posture determining unit 113 can be configured of hardware such as an application specific integrated circuit (ASIC) and a field programmable gate array (FPGA).

For example, the storage 120 corresponds to the RAM and the HDD. The RAM and the HDD can store therein the teaching information 121, the singular point information 122, and the obstacle information 123. Moreover, the robot controller 100 may acquire program and various types of information as described above via other computer and transportable recording medium connected by a wired or wireless network.

The controller 110 performs a motion control of the robot 10. The motion control unit 111 instructs the motor 10a to make the robot 10 take a desired posture on the basis of the teaching information 121. Moreover, the motion control unit 111 improves a motion precision of the robot 10 by performing a feedback control or the like while using an encoder value in the motor 10a.

Herein, the teaching information 121 is prepared in a teaching stage for teaching the robot 10 a motion, and is information including a "job" that is a program for defining a motion path of the robot 10.

When receiving an instruction to be described later from the avoidance operating unit 112 and the posture determining unit 113, the motion control unit 111 determines a posture to be taken by the robot 10 in accordance with the instruction. Then, the motion control unit 111 activates the robot 10 while swiveling the redundant arm 14 (see FIG. 2) so that the control point 20 (see FIG. 1) provided on the fourth axis R is linearly moved with the maintenance of the direction of the fourth axis R (see FIG. 2) as described above, for example.

The specific contents that the motion control unit 111 linearly moves the control point 20 of the robot 10 will be explained below with reference to FIGS. 4A to 4C, FIGS. 5A to 5C, FIGS. 6A to 6C, and FIGS. 7A to 7C.

The avoidance operating unit 112 informs the motion control unit 111 of an instruction to make the robot 10 take an avoidance operation so as not to take a posture in which the third arm 16 (see FIG. 2) as described above becomes a singular point. Herein, a posture in which the third arm 16 becomes a singular point is a posture in which the fourth axis R and the sixth axis T become a straight line (see FIG. 1).

In order to avoid the singular point, the avoidance operating unit 112 makes the redundant axis E cooperate with the second axis L and the like so as to adjust the position of the third axis U located on the leading side of the redundant arm 14. As a result, because a degree of freedom is made in the direction of the fourth axis R, taking a posture in which the third arm 16 becomes a singular point can be avoided even if the direction of the sixth axis T of the third arm 16 is restricted due to a relationship with a workpiece (not illustrated) etc., for example. The details of this point will be explained below with reference to FIG. 8.

Herein, the singular point information 122 is, for example, information including a condition that the fourth axis R and the sixth axis T are "mutually inclined not more than a predetermined degree". The avoidance operating unit 112 determines whether the present posture or a posture to be expected of the robot 10 generated based on the encoder value in the motor 10a matches the condition.

Then, when it matches the condition, the avoidance operating unit 112 informs the motion control unit 111 of the position and trajectory of the third axis U so that the inclination between the corresponding rotation axes does not match the condition as described above. The specific contents in which the avoidance operating unit 112 utilizes the redundant axis E in order to avoid a singular point will be explained below with reference to FIG. 8.

The posture determining unit 113 selects one of "the first posture" in which the redundant axis E that is the rotation axis of the redundant arm 14 is protruded to the leading side of the first arm 13, namely, to the positive direction of the X axis as illustrated in FIG. 1, and "the second posture" in which the redundant axis E is protruded to the opposite side to the leading side, namely, to the negative direction of the X axis.

Specifically, the posture determining unit 113 determines a posture to be able to be taken among the first and second postures on the basis of the obstacle information 123. Moreover, when both postures can be taken, the posture determining unit 113 takes a posture of a higher priority sequence on the basis of the priority sequence previously defined.

Herein, the obstacle information 123 is information that an existence range of various types of apparatuses arranged around the robot 10 is illustrated in three dimensions. The obstacle information 123 can include information that a space (for example, opening and closing area of entrance door in processing device) into which the robot 10 must not intrude is illustrated in three dimensions. Furthermore, the obstacle information 123 can include an existence range of a member, for example, the motor 10aS illustrated in FIG. 2, which is arranged on the robot 10.

The posture determining unit 113 determines whether the first posture is taken or the second posture is taken on the basis of the obstacle information 123, and informs the motion control unit 111 of an instruction that makes the robot 10 take the determined posture.

Figure 4A:
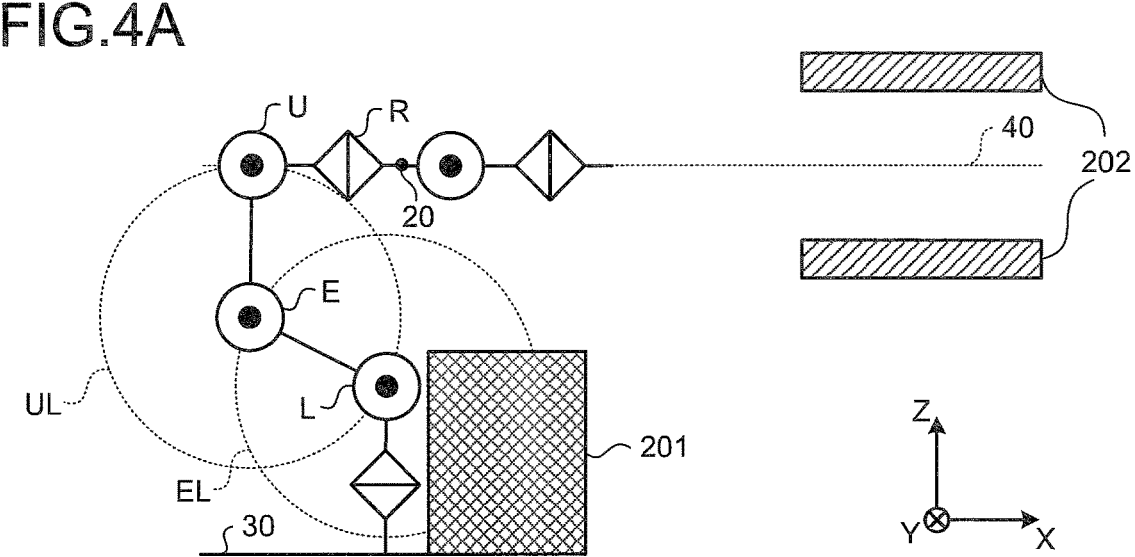
FIGS. 4A to 4C are schematic diagrams illustrating motions in which a control point is linearly moved with the maintenance of the direction of a fourth axis.
Figure 4B:
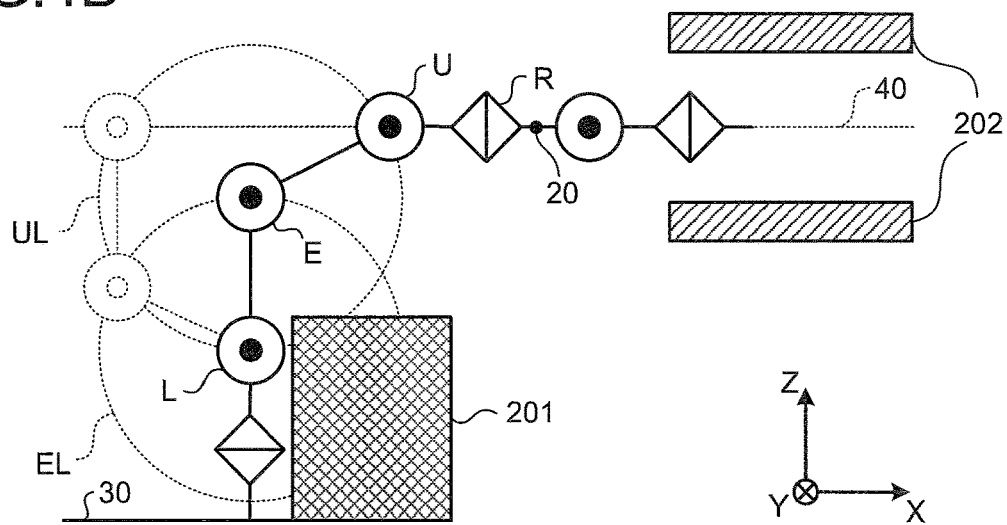
Figure 4C:
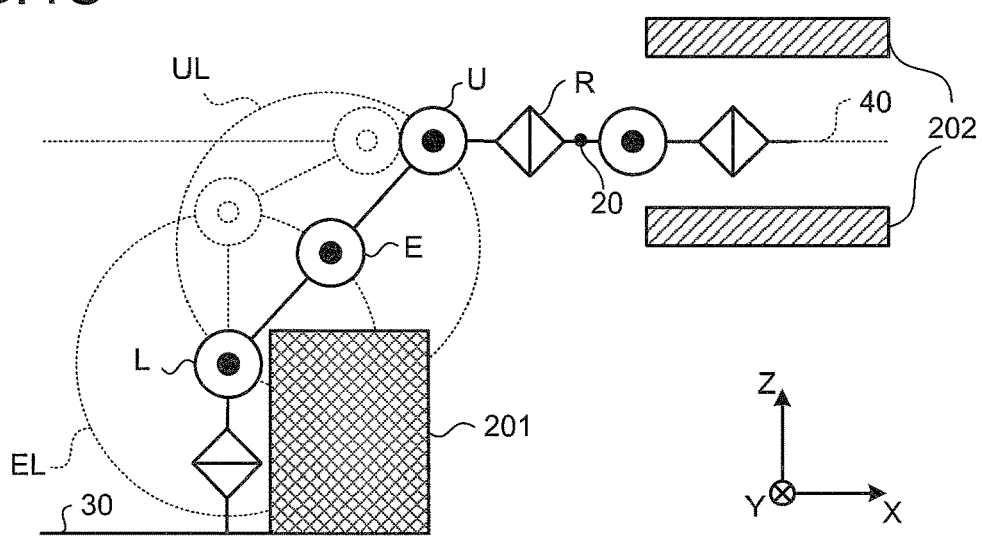
Figure 5A:
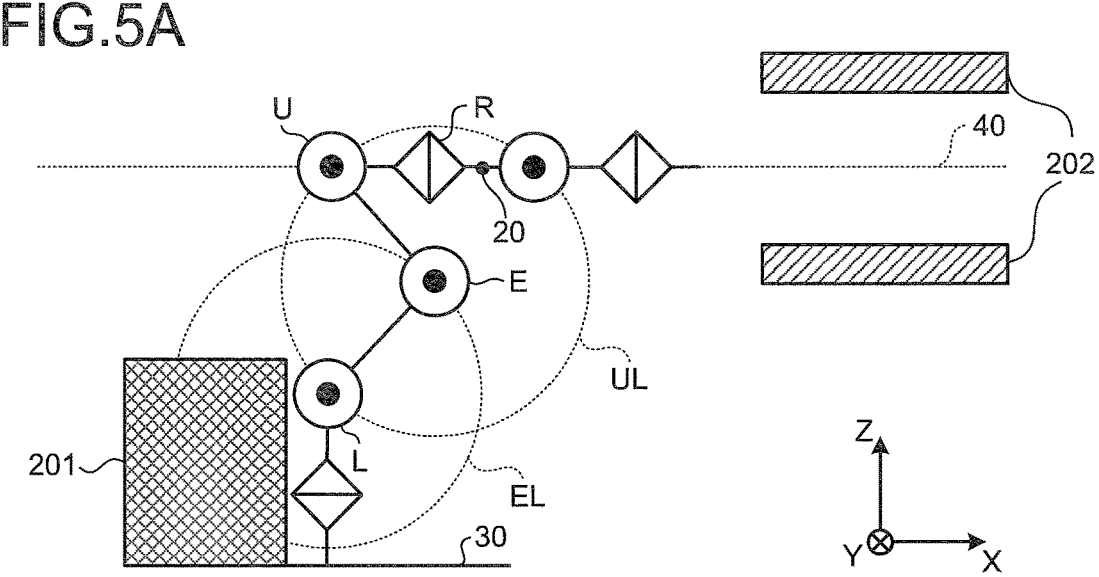
FIGS. 5A to 5C are schematic diagrams illustrating motions when causing a redundant axis to protrude toward a third arm.
Figure 5B:
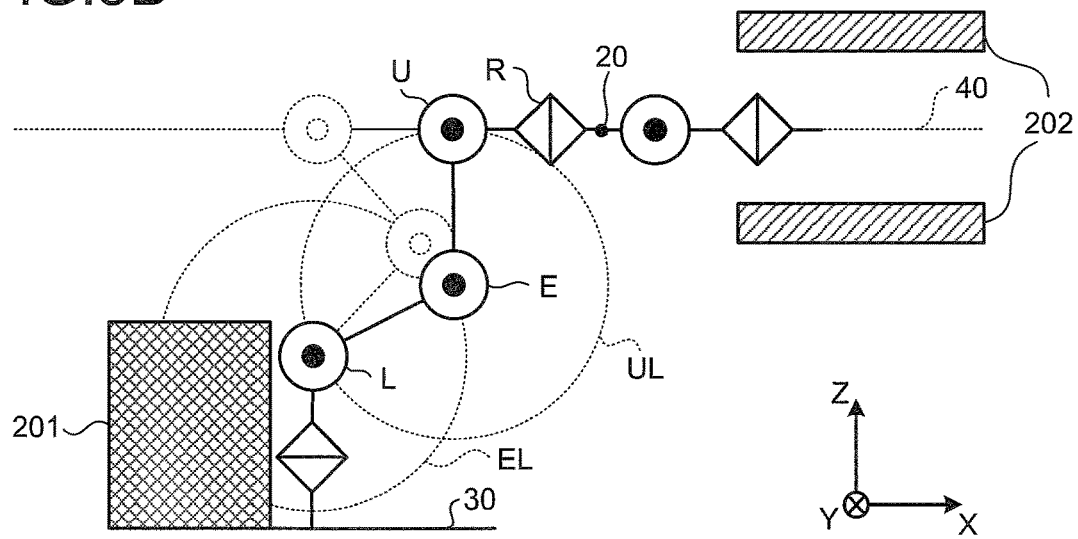
Figure 5C:
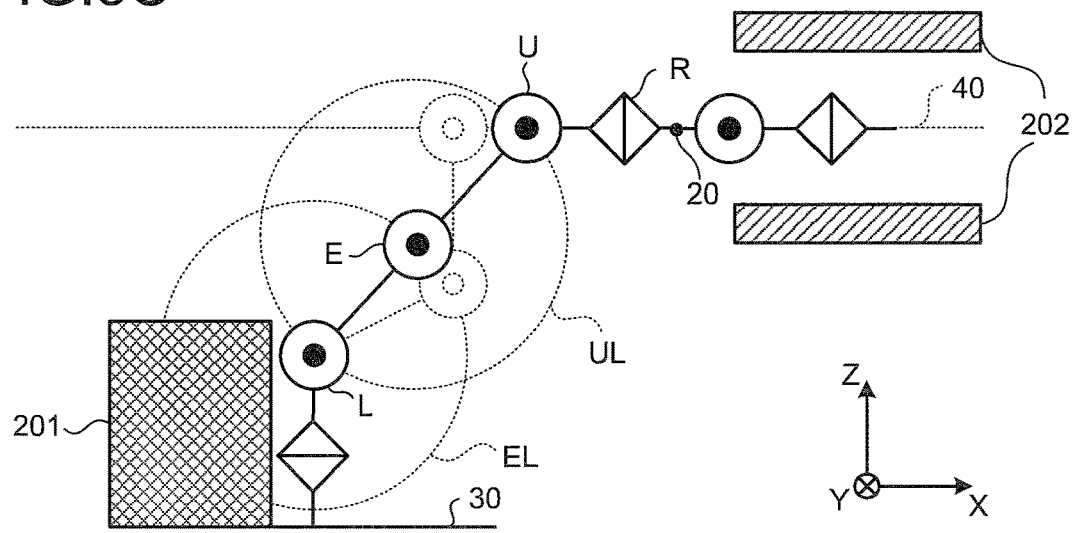

Next, a specific example of a motion of the robot 10 will be explained with reference to FIGS. 4A to 4C and FIGS. 5A to 5C. FIGS. 4A to 4C are schematic diagrams illustrating motions in which the control point 20 is linearly moved with the maintenance of the direction of the fourth axis R. FIGS. 5A to 5C are schematic diagrams illustrating motions when the redundant axis E is protruded toward the third arm 16. Herein, a posture illustrated in FIG. 4A corresponds to "the second posture" as described above, and a posture illustrated in FIG. 5A corresponds to "the first posture" as described above.

FIGS. 4A to 4C illustrate an obstacle 201 and one pair of obstacles 202 corresponding to the obstacle information 123 as described above. The obstacle 201 is, for example, a case-type device. The obstacles 202 are, for example, an upper wall and a lower wall, and schematically indicate a device such as a processing device that is required to access an area located in the back of a narrow passage.

An axis 40 obtained by extending the fourth axis R (see FIG. 2) and the control point 20 provided on the fourth axis R as described above are illustrated in FIGS. 4A to 4C. In other words, the fourth axis R and the axis 40 are coaxial, and the control point 20 moves on the axis 40. Moreover, for reference, the trajectory EL of the redundant axis E illustrated in FIG. 1 and the trajectory UL that indicates a position along which the third axis U is movable when the redundant axis E is located at positions illustrated in the drawings of FIGS. 4A to 4C are illustrated in FIGS. 4A to 4C.

In FIG. 4A, there is the obstacle 201 in the positive direction of the X axis of the robot 10 (see FIG. 1). In this case, the redundant axis E is hard to be protruded toward the obstacle 201. Therefore, the posture determining unit 113 (see FIG. 3) selects a posture in which the redundant axis E is protruded toward an opposite side (the negative direction of the X axis) to the obstacle 201. Then, in the posture illustrated in FIG. 4A, the robot controller rotates the second axis L clockwise and rotates the redundant axis E to cooperate with the second axis L, and thus can move the control point 20 along the axis 40 in the positive direction of the X axis.

In FIG. 4B, there is illustrated a posture of the robot 10 in which the robot has intruded into between the obstacles 202. Furthermore, for reference, the positions of the redundant axis E and the third axis U illustrated in FIG. 4A are illustrated in FIG. 4B with a dotted line.

The robot controller further rotates the second axis L clockwise from the posture illustrated in FIG. 4B and rotates the redundant axis E to cooperate with the rotation of the second axis L, and thus can further move the control point 20 along the axis 40 in the positive direction of the X axis.

A posture of the robot 10 in a state where the first arm 13 and the redundant arm 14 are completely extended is illustrated in FIG. 4C. Moreover, for reference, the positions of the redundant axis E and the third axis U illustrated in FIG. 4B are illustrated in FIG. 4C with a dotted line.

FIGS. 5A to 5C and FIGS. 4A to 4C are different from the viewpoint of the position of the obstacle 201. In other words, in FIGS. 5A to 5C, the obstacle 201 is located in the negative direction of the X axis of the robot 10. As illustrated in FIG. 5A, when the obstacle 201 is located in the negative direction of the X axis of the robot 10, the redundant axis E is hard to be protruded toward the obstacle 201.

Therefore, the posture determining unit 113 (see FIG. 3) selects a posture in which the redundant axis E is protruded toward an opposite side (the positive direction of the X axis) to the obstacle 201. Then, in the posture illustrated in FIG. 5A, the robot controller rotates the second axis L clockwise and rotates the redundant axis E to cooperate with the second axis L, and thus can move the control point 20 along the axis 40 in the positive direction of the X axis.

In FIG. 5B, there is illustrated a posture of the robot 10 in which the robot has intruded into between the obstacles 202. Furthermore, for reference, the positions of the redundant axis E and the third axis U illustrated in FIG. 5A are illustrated in FIG. 5B with a dotted line.

The robot controller further rotates the second axis L counterclockwise from the posture illustrated in FIG. 5B and rotates the redundant axis E to cooperate with the rotation of the second axis L, and thus can further move the control point 20 along the axis 40 in the positive direction of the X axis.

A posture of the robot 10 in a state where the first arm 13 (see FIG. 1) and the redundant arm 14 (see FIG. 1) are completely extended is illustrated in FIG. 5C. Moreover, for reference, the positions of the redundant axis E and the third axis U illustrated in FIG. 5B are illustrated in FIG. 5C with a dotted line.

Even if the robot controller takes the posture in which the redundant axis E protrudes toward the opposite side to the leading side of the robot 10 as illustrated in FIGS. 4A to 4C, or even if the robot controller takes the posture in which the redundant axis E protrudes toward the leading end of the robot 10 as illustrated in FIGS. 5A to 5C, the robot controller can linearly move the control point 20 provided on the fourth axis R with the maintenance of the direction of the fourth axis R.

In FIGS. 4A to 4C and FIGS. 5A to 5C, there has been explained a case in which the control point 20 is linearly moved in the positive direction of the X axis. However, by activating the robot in a reverse procedure, it is obvious that the control point 20 can be linearly moved in the negative direction of the X axis.

Figure 6A:
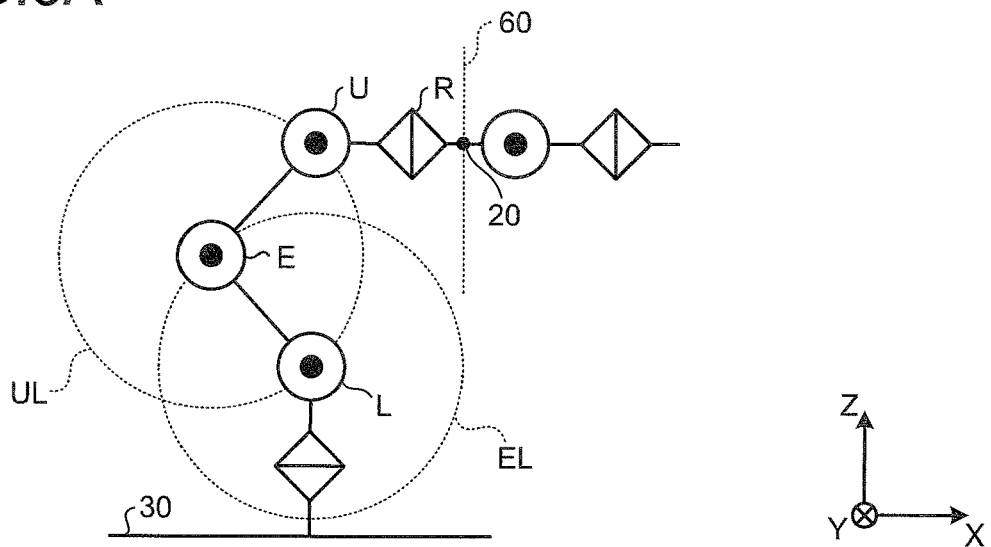
FIGS. 6A to 6C are schematic diagrams illustrating motions in which a control point is moved in a direction perpendicular to the fourth axis.
Figure 6B:
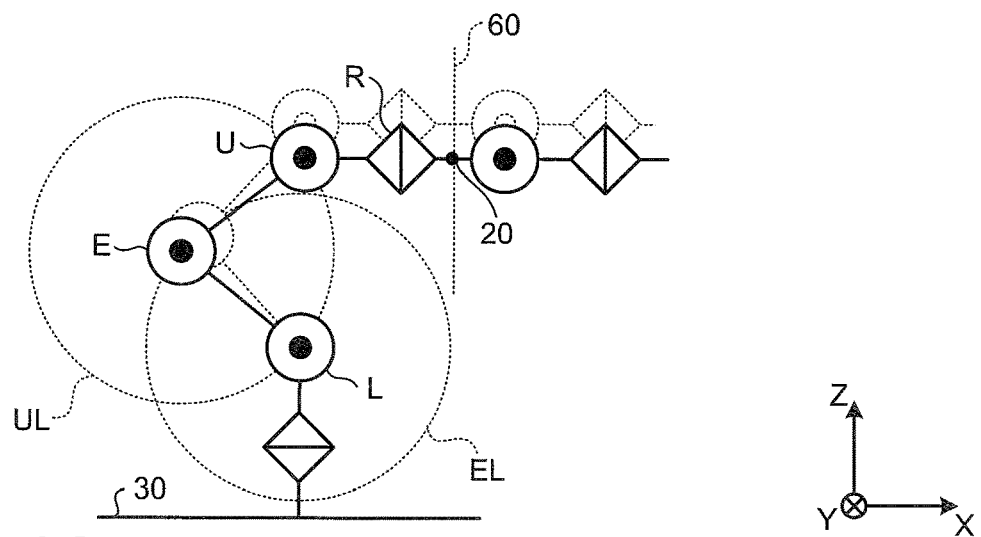
Figure 6C:
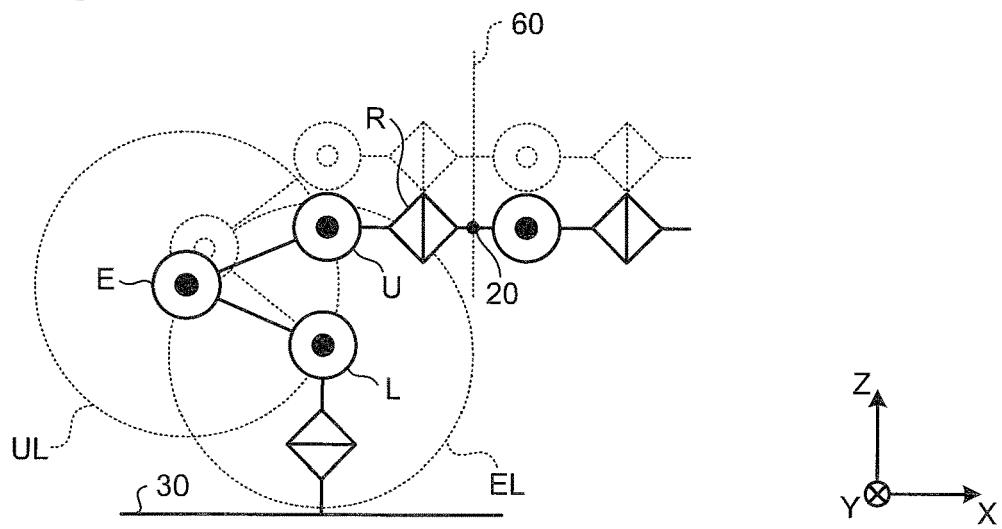

Next, a motion in which the control point 20 provided on the fourth axis R is linearly moved in a direction perpendicular to the fourth axis R with the maintenance of the direction of the fourth axis R will be explained with reference to FIGS. 6A to 6C. FIGS. 6A to 6C are schematic diagrams illustrating motions in which the control point 20 is moved in the direction perpendicular to the fourth axis R.

In FIGS. 6A to 6C, there is illustrated an axis 60 that is perpendicular to the fourth axis R (see FIG. 2) as described above at the position of the control point 20. Moreover, for reference, the trajectory EL of the redundant axis E illustrated in FIG. 1 and the trajectory UL that indicates a position along which the third axis U is movable when the redundant axis E is located at positions illustrated in the drawings of FIGS. 6A to 6C are illustrated in FIGS. 6A to 6C. In FIGS. 6A to 6C, the obstacle 201 and the obstacles 202 illustrated in FIGS. 4A to 4C are omitted.

The robot controller rotates the second axis L counterclockwise from the posture illustrated in FIG. 6A and rotates the redundant axis E to cooperate with the second axis L, and thus can move the control point 20 along the axis 60 in the negative direction of the Z axis.

For reference, a position of each joint illustrated in FIG. 6A is illustrated in FIG. 6B with a dotted line. The robot controller further rotates the second axis L counterclockwise from the posture illustrated in FIG. 6B and rotates the redundant axis E to cooperate with the rotation of the second axis L, and thus can further move the control point 20 along the axis 60 in the negative direction of the Z axis.

The posture of the robot 10 as described above is illustrated in FIG. 6C. For reference, a position of each joint illustrated in FIG. 6B is illustrated in FIG. 6C with a dotted line. As described above, the robot 10 can linearly move the control point 20 in the direction perpendicular to the fourth axis R with the maintenance of the direction of the fourth axis R.

In FIGS. 6A to 6C, there has been explained the case where the control point 20 is linearly moved in the negative direction of the Z axis. However, it is obvious that the control point 20 can be linearly moved in the positive direction of the Z axis by activating the robot in a reverse procedure.

Figure 7A:
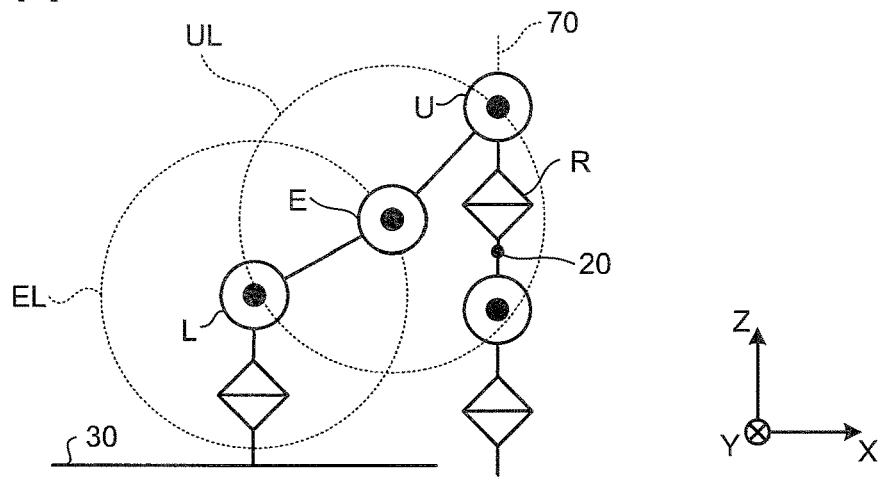
FIGS. 7A to 7C are schematic diagrams illustrating motions in which a control point is moved along the vertical-direction fourth axis.
Figure 7B:
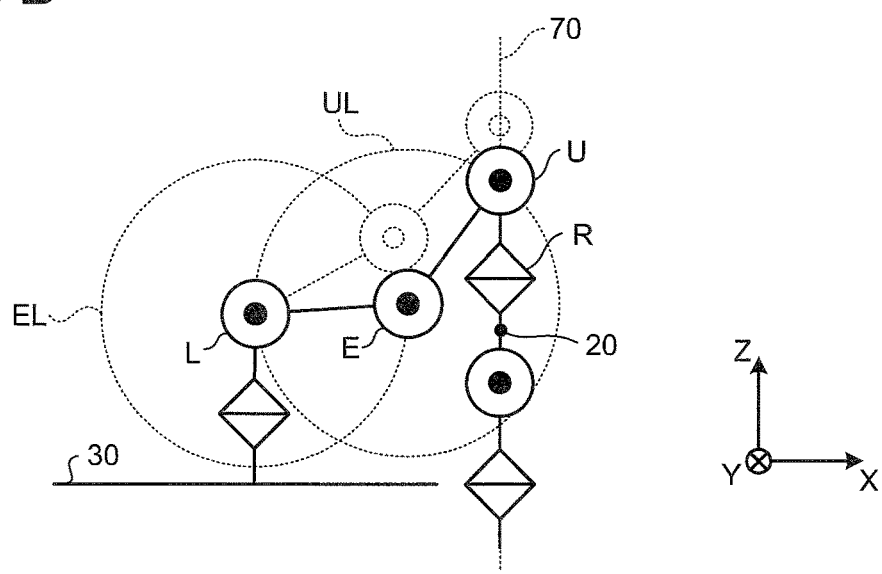
Figure 7C:
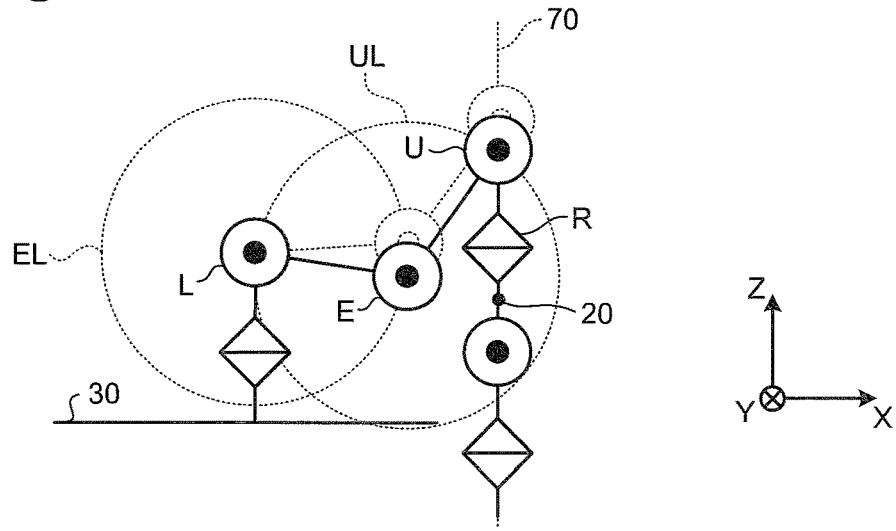

Next, a motion in which the control point 20 provided on the fourth axis R is moved in a vertical direction while maintaining the fourth axis R (see FIG. 2) in the vertical direction will be explained with reference to FIGS. 7A to 7C. FIGS. 7A to 7C are schematic diagrams illustrating motions in which the control point 20 is moved along the vertical-direction fourth axis R.

An axis 70 obtained by extending the vertical-direction fourth axis R (see FIG. 2) and the control point 20 provided on the fourth axis R are illustrated in FIGS. 7A to 7C. In other words, the fourth axis R and the axis 70 are coaxial, and the control point 20 moves on the axis 70. For reference, the trajectory EL of the redundant axis E illustrated in FIG. 1 and the trajectory UL that indicates a position along which the third axis U is movable when the redundant axis E is located at positions illustrated in the drawings of FIGS. 7A to 7C are illustrated in FIGS. 7A to 7C. In FIGS. 7A to 7C, the obstacle 201 and the obstacles 202 illustrated in FIGS. 4A to 4C etc. are omitted.

The robot controller rotates the second axis L clockwise from the posture illustrated in FIG. 7A and rotates the redundant axis E to cooperate with the second axis L, and thus can move the control point 20 along the axis 70 in the negative direction of the Z axis.

For reference, the positions of the redundant axis E and the third axis U illustrated in FIG. 7A are illustrated in FIG. 7B with a dotted line. The robot controller further rotates the second axis L clockwise from the posture illustrated in FIG. 7B and rotates the redundant axis E to cooperate with the rotation of the second axis L, and thus can further move the control point 20 along the axis 70 in the negative direction of the Z axis.

The posture of the robot 10 as described above is illustrated in FIG. 7C. For reference, the positions of the redundant axis E and the third axis U illustrated in FIG. 7B are illustrated in FIG. 7C with a dotted line. As described above, the robot 10 can linearly move the control point 20 along the axis 70 coaxial with the fourth axis R while maintaining the direction of the fourth axis R in the vertical direction.

In FIGS. 7A to 7C, the case where the control point 20 is moved in the negative direction of the Z axis has been explained. However, it is obvious that the control point 20 can be linearly moved in the positive direction of the Z axis by activating the robot in a reverse procedure. Furthermore, in FIGS. 7A to 7C, the case where the leading side of the robot 10 is directed to the negative direction of the Z axis has been explained. However, it is obvious that even in the case where the leading side of the robot 10 is directed to the positive direction of the Z axis, the control point 20 can be linearly moved in the positive and negative directions of the Z axis through a similar motion.

As described above, in the case illustrated in FIGS. 7A to 7C, the robot controller can linearly move the control point 20 without changing the posture of the second arm 15 and the third arm 16 illustrated in FIG. 2. In FIGS. 7A to 7C, the case where the control point 20 is linearly moved along the Z axis illustrated in the present drawing has been explained. However, the robot controller may linearly move the control point 20 along the Y axis.

The robot controller causes the first axis S (see FIG. 1), the second axis L, and the redundant axis E to cooperate with one another when linearly moving the control point 20 along the Y axis. In this case, because the third axis U swivels around the first axis S, the direction of the third axis U is changed. However, the robot controller can linearly move the control point 20 in the positive and negative directions of the Y axis by performing a cooperative operation on the fourth axis R in a direction canceling the change of the direction of the third axis U without changing the posture of the third arm 16.

Figure 8:
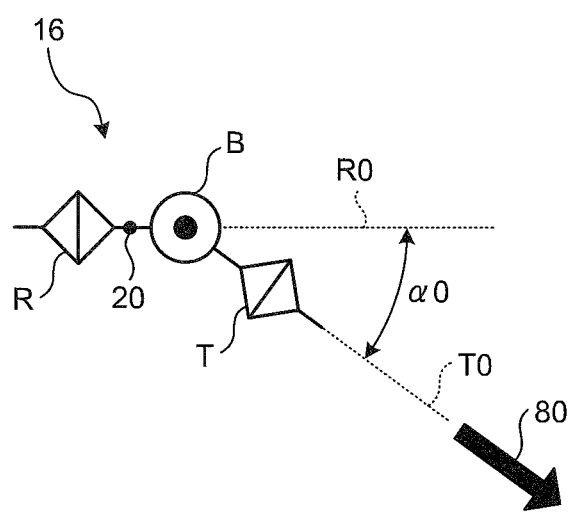
FIG. 8 is a diagram explaining the avoidance of a singular point of the third arm.

Next, the avoidance of a singular point of the third arm 16 (see FIG. 2) will be explained with reference to FIG. 8. FIG. 8 is a diagram explaining the avoidance of a singular point of the third arm 16. The fourth axis R, the fifth axis B, and the sixth axis T included in the third arm 16, an axis R0 obtained by extending the fourth axis R, and the control point 20 provided on the axis R are illustrated in FIG. 8.

In FIG. 8, there is further illustrated an axis T0 obtained by extending the sixth axis T and an angle $\alpha 0$ that is an angle formed by the axis T0 and the axis R0. Moreover, an arrow 80 indicates a direction in which the axis T0 is restricted. The case where the axis R0 is a horizontal direction and the axis T0 is a diagonally downward direction has been illustrated in FIG. 8. However, the axis T0 may be restricted in a horizontal direction or in a vertical direction. In other words, FIG. 8 illustrates merely a situation that the axis T0 and the axis R0 form a predetermined angle.

As explained already by using FIG. 3, the avoidance operating unit 112 avoids taking a posture in which the third arm 16 becomes a singular point even if the direction of the sixth axis T of the third arm 16 is restricted by a relationship with a workpiece (not illustrated) etc.

In the case of FIG. 8, the singular point information 122 (see FIG. 3) includes, for example, a condition that the fourth axis R and the sixth axis T "are mutually inclined not more than α0 degrees". The condition is a condition indicating the effect that a relationship between the fourth axis R and the sixth axis T is close to the singular point. The avoidance operating unit 112 adjusts the direction of the fourth axis R on the basis of this condition of the singular point information 122 so that an angle formed by the fourth axis R (axis R0 of FIG. 8) and the sixth axis T (axis T0 of FIG. 8) becomes larger than α0 degrees.

As a result, the robot controller can make the robot 10 perform motions illustrated in FIGS. 4A to 4C, FIGS. 5A to 5C, FIGS. 6A to 6C, and FIGS. 7A to 7C while avoiding the singular point of the third arm 16. In other words, the robot controller can linearly move the control point 20 with the maintenance of the direction of the fourth axis R while avoiding the singular point of the third arm 16.

Next, a processing procedure that is executed by the robot controller 100 will be explained with reference to FIG. 9. FIG. 9 is a flowchart illustrating a processing procedure that is executed by the robot controller 100. As illustrated in FIG. 9, the posture determining unit 113 reads the obstacle information 123 (Step S101), and determines curved directions of the first arm 13 and the redundant arm 14 (Step S102).

The motion control unit 111 acquires a rotation angle of each motor 10a (Step S103), and computes a posture of the robot 10 (Step S104). Next, the avoidance operating unit 112 determines whether the posture of the third arm 16 is close to a singular point (Step S105).

Then, when the posture of the third arm 16 is close to the singular point (Step S105: Yes), the avoidance operating unit 112 instructs the robot 10 to perform an avoidance operation using the redundant axis E via the motion control unit 111 (Step S106). On the other hand, when the posture of the third arm 16 is not close to the singular point (Step S105: No), the control advances to Step S107 without performing the process of Step S106.

Next, the motion control unit 111 linearly moves the control point 20 while maintaining the direction of the fourth axis R (Step S107), and terminates the process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot system comprising:
a robot including:
a bottom that is fixed to an installation surface;
a swiveling base that is supported on the bottom rotatably around a vertical-direction first axis;
a first arm of which a bottom side is supported on the swiveling base swivelably around a horizontal-direction second axis;
a redundant arm of which a bottom side is supported on a leading side of the first a swivelably around a redundant axis parallel to the second axis;
a second arm of which a bottom side is supported on a leading side of the redundant arm swivelably around a third axis parallel to the second axis; and
a third arm of which a bottom side is supported on a leading side of the second arm rotatably around a fourth axis perpendicular to the third axis; and
a processor programmed to move the redundant arm so that the fourth axis linearly moves with the fourth axis being oriented to a constant direction, wherein
the swiveling base, the first arm, and the redundant arm are coupled such that the third axis is constantly aligned in parallel with the second axis and the redundant axis.

2. The robot system according to claim 1, wherein the processor is further programmed to linearly move the control point in a direction parallel to the direction of the fourth axis.

3. The robot system according to claim 1, wherein the processor is further programmed to linearly move the control point in a direction perpendicular to the direction of the fourth axis.

4. The robot system according to claim 1 wherein
the third arm includes a fifth axis perpendicular to the fourth axis and a sixth axis perpendicular to the fifth axis, and
the processor is further programmed to move the redundant arm so that the fourth and sixth axes are not located on a same straight line when a direction of the sixth axis is restricted.

5. The robot system according to claim 1, wherein the processor is further programmed to control, based on a three-dimensional layout of an obstacle around the robot, the robot to be in one of a first posture and a second posture, the first arm and the redundant arm being bent in a state where the redundant axis is protruded toward a leading end of the third arm when the robot is in the first posture, the first arm and the redundant arm being bent in a state where the redundant axis is protruded toward an opposite side to the leading end of the third arm when the robot is in the second posture.

* * * * *